(12) United States Patent
Song et al.

(10) Patent No.: US 10,545,361 B2
(45) Date of Patent: Jan. 28, 2020

(54) DISPLAY DEVICE HOUSING AND DISPLAY DEVICE COMPRISING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yong Song, Beijing (CN); Gang Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/526,979

(22) PCT Filed: May 13, 2016

(86) PCT No.: PCT/CN2016/082026
§ 371 (c)(1),
(2) Date: May 15, 2017

(87) PCT Pub. No.: WO2017/140049
PCT Pub. Date: Aug. 24, 2017

(65) Prior Publication Data
US 2018/0059467 A1 Mar. 1, 2018

(30) Foreign Application Priority Data

Feb. 15, 2016 (CN) .......................... 2016 1 0086351

(51) Int. Cl.
*G02F 1/1333* (2006.01)
*G06F 1/16* (2006.01)
*G02F 1/1335* (2006.01)

(52) U.S. Cl.
CPC .. *G02F 1/133308* (2013.01); *G02F 1/133608* (2013.01); *G06F 1/1601* (2013.01);
(Continued)

(58) Field of Classification Search
CPC ......... G02F 1/133308; G02F 1/133608; G02F 2001/133317; G02F 2201/46; G06F 1/1601
(Continued)

(56) References Cited

U.S. PATENT DOCUMENTS 7,852,424 B2 * 12/2010 Sugawara ......... G02F 1/133308
349/122
7,864,261 B2 * 1/2011 Chen .................... G02B 6/0088
349/58

(Continued)

FOREIGN PATENT DOCUMENTS

CN     1743909 A       3/2006
CN     201107498 Y *  8/2008  ............... G02F 1/13
(Continued)

OTHER PUBLICATIONS

Office Action in Chinese Application No. 201610086351.8 with English translation, dated Jun. 29, 2017.
(Continued)

*Primary Examiner* — Rockshana D Chowdhury
(74) *Attorney, Agent, or Firm* — Womble Bond Dickinson (US) LLP

(57) ABSTRACT

The present disclosure relates to a technical field of display and in particular to a display device housing and a display device. The display device housing includes a front frame and a back plate which cooperate to form an accommodation portion for accommodating a display panel and a backlight module; and at least one elastic member mounted inside the front frame, wherein at least a portion of each of the elastic
(Continued)

members is disposed between the front frame and a side face of the display panel to be mounted. The above display device housing can avoid the appearance of discrete bright spots in a display screen of the display device generated under long-time shock, and can also alleviate or eliminate light leakage in the display device.

10 Claims, 2 Drawing Sheets

(52) U.S. Cl.
CPC ............ *G02F 2001/133317* (2013.01); *G02F 2201/46* (2013.01)

(58) Field of Classification Search
USPC .................................................... 361/679.21
See application file for complete search history.

(56) References Cited

U.S. PATENT DOCUMENTS

| | | | |
|---|---|---|---|
| 2008/0285223 A1 | 11/2008 | Sugawara | |
| 2012/0105762 A1* | 5/2012 | Que | G02F 1/133608 349/60 |
| 2014/0036195 A1 | 2/2014 | Kuo et al. | |
| 2014/0160393 A1* | 6/2014 | Zhang | G02F 1/133308 349/58 |
| 2015/0103286 A1* | 4/2015 | Cho | G02F 1/133308 349/58 |
| 2016/0213173 A1 | 6/2016 | Xu et al. | |

FOREIGN PATENT DOCUMENTS

| | | |
|---|---|---|
| CN | 101308263 A | 11/2008 |
| CN | 201266282 Y | 7/2009 |
| CN | 101876758 A | 11/2010 |
| CN | 202008560 U | 10/2011 |
| CN | 102778769 A | 11/2012 |
| CN | 204348262 U | 5/2015 |
| CN | 105487278 A | 4/2016 |
| JP | 2013072958 A | 4/2013 |

OTHER PUBLICATIONS

International Search Report with English language translation, dated May 13, 2016, International Application No. PCT/CN2016/082026 ( 14 pages).

Chinese Office Action with English language translation, dated Jan. 12, 2017, Chinese Application No. 201610086351.8 (12 pages).

Chinese Office Action with English language translation, dated Sep. 30, 2017, Chinese Application No. 201610086351.8, 10 pages (7 pages of English Translation and 3 pages of original Document).

* cited by examiner

DISPLAY DEVICE HOUSING AND DISPLAY DEVICE COMPRISING THE SAME

RELATED APPLICATIONS

The present application claims the benefit of a Chinese Patent Application No. 201610086351.8, filed on Feb. 15, 2016, the entire disclosure of which is incorporated herein by reference.

FIELD OF THE DISCLOSURE

The present disclosure relates to a technical field of display and in particular to a display device housing and a display device including such a display device housing.

BACKGROUND OF THE DISCLOSURE

With the continuous development of display technologies, currently, display devices have become widely used in automobile industry. However, because the practical use state of the automobile is different from a mobile phone, a tablet and the like, the display devices used in the automobile have new and stricter requirements in their performance. First, because the automobile will generate shocks all the time during its long process of driving, the display device used in automobile should have a long term shock resistance.

In existing display devices, the perimeter of a display panel is provided with a front frame which can limit and protect the display panel. Because there are spaces between the front frame and the four side faces of the display panel, under long term shocks, the display panel can easily oscillate in the front frame. In the case that the oscillation of the display panel causes the display panel to hit the front frame, because the front frame is generally made of hard plastic or even metal, the display panel will be subjected to a large impact. Such impact might cause a friction between an alignment film (polimide, PI) inside the display panel and a post spacer (PS). Then, the friction between the polimide (PI) and the post spacer (PS) for a long time will cause an abrasion to a certain extent on the surface of the polimide and generates PI debris. When the display device is operating, discrete bright spots will be generated on the entire display screen by the PI debris which will greatly affect the display quality.

Besides, during the assembly and usage of the display device, external pressure might be applied to the front frame of the display device and cause the front frame to deform, resulting in light leakage in the display device.

Therefore, an improved display device is needed to overcome the above mentioned drawbacks.

SUMMARY OF THE DISCLOSURE

The present disclosure provides a display device housing and a display device comprising such a display device housing, which can solve one or more of the above mentioned drawbacks and other drawbacks in prior art.

According to an aspect of the present disclosure, a display device housing is provided which comprising a front frame and a back plate which cooperate to form an accommodation portion for accommodating a display panel and a backlight module; and at least one elastic member mounted inside the front frame toward the accommodation portion, wherein at least a portion of each of the elastic members is disposed between the front frame and a side face of the display panel to be mounted.

In the above display device housing, when the display panel is mounted in the accommodation portion of the display device housing, at least a portion of the elastic member is located between the front frame and the side face of the display panel. Therefore, when the shock of the display device housing causes the display panel to oscillate in the accommodation portion, the side face of the display panel will first contact the elastic member located inside the front frame and obtain an elastic buffer given by the elastic member. In this way, the above at least one elastic member at one hand can reduce the oscillation amplitude of the display panel, and on the other hand can avoid a larger sudden impact applying to the display panel due to collision with the front frame when oscillating to and fro. Besides, the provision of elastomer can reduce the deformation of the front frame caused by external force, thereby alleviating or eliminating the light leakage risk of the display device.

Furthermore, the elastic member, as a buffer element, has the advantages of good elastic property, long life and the like, and it can be designed to be small in volume. Therefore, it is suitable to be used as a buffer structure in the display device housing.

In some embodiment, the front frame comprises a front bezel which is used to limit the edge of a light emitting surface of the display panel and a side bezel which is used to surround the side faces of the display panel; and the elastic member in the front frame extends from the side bezel towards the front bezel.

In further embodiments, the elastic member extends to the vicinity of a location of the front frame which is directly opposite to the side face of the display panel to be mounted.

In some embodiments, a portion of the elastic member extending to the vicinity of the front bezel comprises a stop portion which is used to limit the side face of the display panel.

In some embodiments, each of the elastic members also comprises a mounting portion which is fixedly connected to the side bezel of the front frame or the back plate and a connecting portion connecting the stop portion and the mounting portion.

In some embodiments, the connecting position between the stop portion and the connecting portion and the connecting position between the mounting portion and the connecting portion are right-angled.

In some embodiments, the mounting portion and the side bezel of the front frame or the back plate are fixedly connected by bonding or snap fitting.

In some embodiments, the elastic member is an integral structure and is made of soft material.

According to another aspect of the present disclosure, a display device is provided which comprises a display device housing according to any one of the above technical solutions and a display panel located in the accommodation portion of the display device housing.

In some embodiments, the minimum distance between the elastic member of the display device housing and the front bezel of the front frame is less than the minimum distance between the light emitting surface of the display panel and the front bezel of the front frame.

In some embodiments, the display device comprises a backlight module located in the accommodation portion of the display device housing; the back plate is provided with a bent bezel surrounding the side faces of the backlight module, and the bent bezel is located between the side bezel of the front frame and the side faces of the backlight module and is connected with the side bezel of the front frame.

In some embodiments, the mounting portion of the elastic member is located between the side bezel of the front frame and the bent bezel of the back plate and is connected with the bent bezel of the back plate by snap fitting or bonding.

In some embodiments, the stop piece, the connecting portion and the mounting portion of the elastic member are connected in sequence in stepped shape.

In some embodiments, the connecting portion of the elastic member contacts the end face of the bent bezel of the back plate.

In some embodiments, the display device housing comprises a plurality of elastic members; the plurality of elastic members are distributed at two opposite sides of the display panel uniformly, and the extending direction of the two sides is parallel to the extending direction of data lines in the display panel.

BRIEF DESCRIPTION OF THE DRAWINGS

In order to illustrate the embodiments of the present disclosure more clearly, the drawings used in the detailed description of embodiments will be briefly described. Obviously, the drawings in the following description are only some embodiments of the present disclosure. Those skilled in the art can obtain other embodiments based on these drawings without creative efforts. It should be appreciated that the drawings are not necessarily drawn to scale and certain features may be exaggerated in order to better illustrate and explain the present disclosure.

DETAILED DESCRIPTION OF THE DISCLOSURE

The technical solutions in the embodiments of the present disclosure will be described clearly and thoroughly with reference to the drawings in the embodiments of the present disclosure. It is clear that the described embodiments are only part of embodiments of the present disclosure, not all embodiments of the present disclosure. Based on the embodiments of the present disclosure, other embodiments acquired by ordinary technicians of this field on the premise of paying no creative work all belong to the protected scope of the embodiments of the present disclosure.

Figure 1:
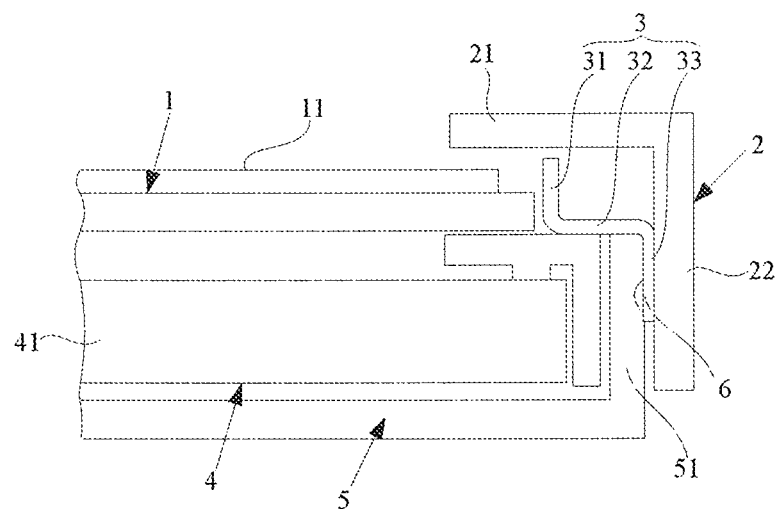
FIG. 1 is a cross-sectional view of a display device housing according to an embodiment of the present disclosure.
Figure 2:
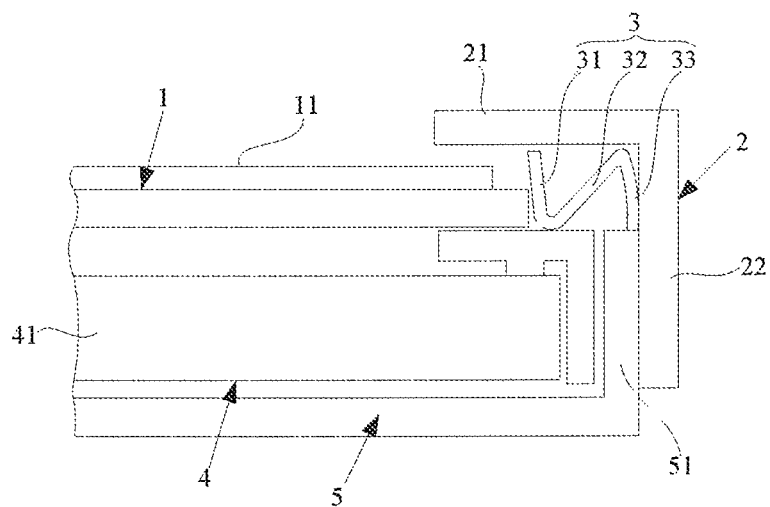
FIG. 2 is a cross-sectional view of a display device housing according to another embodiment of the present disclosure.

FIG. 1 and FIG. 2 are sectional views schematically showing display device housings according to two different embodiments of the present disclosure. It can be seen that the difference between the two embodiments lies in that the construction and the arrangement of the elastic members 3 are different from each other. Both of the two elastic members can protect the display screen and the bezel.

As shown in FIG. 1 and FIG. 2, a display device provided by an embodiment of the present disclosure, comprises a front frame 2 and a back plate 5 which cooperate to form an accommodation portion for accommodating a display panel 1 and a backlight module 4; and at least one elastic member 3 mounted inside the front frame 2, wherein at least a portion of each of the elastic members 3 is disposed between the front frame 2 and the display panel 1 to be mounted. The elastic member 3 may extend to the vicinity of a location of the front frame 2 which is directly opposite to the side face of the display panel 1 to be mounted.

In the above display device housing, at least one elastic member is mounted inside the front frame 2 (at a side facing the accommodation portion), wherein at least a portion of each of the elastic members 3 extends to the vicinity of the location of the front frame 2 which is directly opposite to the side face of the display panel 1 to be mounted. When the display panel 1 is mounted in the accommodation portion of the display device housing, at least a portion of each of the elastic members 3 is located between the front frame 2 and the side face of the display panel 1. Therefore, when the shock of the display device housing causes the display panel 1 to oscillate in the accommodation portion, the side face of the display panel 1 will first contact the elastic member 3 located in the front frame 2 and is subjected to elastic buffer given by the elastic member 3. In this way, the above at least one elastic member 3 at one hand can avoid large sudden impact applying to the display panel 1 due to collision with the front frame 2 when the display panel 1 oscillating to and fro. Thereby, the friction between the polimide (PI) inside the display panel 1 and the post spacer (PS) can be avoided and therefore the generation of the PI debris can be avoided. In this way, the above display device housing can avoid the generation of bright spots in the display screen under long-time shock. Besides, the provision of elastomer can reduce the deformation of the front frame caused by external force, thereby alleviating or eliminating the light leakage risk of the display device.

Furthermore, the elastic member 3, as a buffer element, has the advantages of good elastic property, long life and the like, and it can be designed to be small in volume. Therefore, it is suitable to be used as buffer structure in the display device housing. Optionally, the elastomer 3 can be made of soft materials so as to enhance the protection effect.

As shown in FIG. 1 and FIG. 2, in a specific embodiment, in the display device housing of the present disclosure, the front frame 2 comprises a front bezel 21 which is used to limit the edge of a light emitting surface 11 of the display panel 1 and a side bezel 22 which is used to surround the side face of the display panel.

As shown in FIG. 1 and FIG. 2, in a specific embodiment, in the display device housing of the present disclosure, the above elastic member 3 can comprises a stop portion 31 which is opposite to the size bezel 22 of the front frame 2 and is used to limit the side face of the display panel 1. According to an aspect of the present disclosure, the stop portion 31 is parallel to the side face of the display panel 1.

As shown in FIG. 1 and FIG. 2, moreover, each of the elastic members 3 also comprises a mounting portion 33 which is fixedly connected to the side bezel 22 of the front frame 2 and a connecting portion 32 connecting the stop portion 31 and the mounting portion 33. According to an aspect of the present disclosure, the stop portion 31, the connecting portion 32 and the mounting portion 33 can be an integral structure, that is, the elastic member 3 can be an integral structure; the integral elastic member 3 has good elastic property and high reliability.

As shown in FIG. 1 and FIG. 2, an embodiment of the present disclosure provides a display device comprising a display device housing according to any one of the embodiments and a display panel 1 located in the accommodation portion of the display device housing.

In the display device of the present disclosure, as shown in FIG. 1 and FIG. 2, there is at least one elastic member 3 between the front frame 2 and the side face of the display panel 1. When the shock of the display device causes the display panel 1 to oscillate in the accommodation portion 1, the side face of the display panel 1 will first contact the above mentioned elastic member 3 and is subjected to elastic buffer given by the elastic member 3. In this way, the above at least one elastic member 3 can avoid large sudden impact applying to the display panel 1 due to collision with the front frame 2 when the display panel 1 oscillating to and fro. Thereby, the friction between the polimide (PI) inside the display panel 1 and the post spacer (PS) can be avoided and therefore the generation of the PI debris can be avoided. In this way, the above display device housing can avoid the generation of bright spots in the display screen under long-time shock.

As shown in FIG. 1 and FIG. 2, in a specific embodiment, the minimum distance between the elastic member 3 and the front bezel 21 of the front frame 2 is less than the minimum distance between the light emitting surface 11 of the display panel 1 and the front bezel 21, that is, the gap width between the top most point of the elastic member 3 and the front bezel 21 is less than the gap width between the light emitting surface 11 of the display panel 1 and the front bezel 21. Therefore, the elastic member 3 can limit the front bezel 21. Specifically, when the pressure on the front bezel 21 causes it to tilt towards the light emitting surface 11 of the display panel 1, the front bezel 21 will first contact the elastic member 3 so as to be supported by the elastic member 3. In this way, the elastic member 3 can avoid the front bezel 21 to be excessively deformed under force, and in turn avoid edge light leakage of the display device when showing fully black picture.

As shown in FIG. 1 and FIG. 2, based on the above embodiment, in a preferred embodiment, in the display device of the present disclosure, the distance between the portion of the stop portion 31 of the elastic member 3 nearest to the front bezel 21 and the front bezel 21 is less than the distance between the light emitting surface 11 of the display panel 1 and the front bezel 21. In this way, the side of the stop portion 31 near the front bezel 21 can limit the front bezel 21. Specifically, when pressure is exerted on the front bezel 21 and causes the front bezel 21 to tilt towards the light emitting surface 11 of the display panel 1, the front bezel 21 will first contact the stop portion 31 and then be supported by the stop portion 31. In this way, the elastic member 3 can avoid the front bezel 21 to be excessively deformed under force, and in turn avoid edge light leakage of the display device when showing fully black picture.

As shown in FIG. 1 and FIG. 2, based on the above embodiment, in a specific embodiment, the display device of the present disclosure also comprises a backlight module 4 located in the accommodation portion of the display device housing. The backlight module comprises a light source, a light guide plate 41 and a diffusion plate and the like to provide back light to the display panel 1. In the display device housing, the back plate 5 is provided with a bent bezel 51 to surround the side face of the backlight module 4. The bent bezel 51 is located between the side bezel 22 of the front frame 2 and the side face of the backlight module 4 and is snap-fitted with the side bezel 22 of the front frame 2.

As shown in FIG. 1 and FIG. 2, based on the above embodiment, in a specific embodiment, the display device of the present disclosure also comprises a backlight module 4 located in the accommodation portion of the display device housing. The backlight module comprises a light source, a light guide plate 41 and a diffusion plate and the like to provide back light to the display panel 1. In the display device housing, the back plate 5 is provided with a bent bezel 51 to surround the side face of the backlight module 4. The bent bezel 51 is located between the side bezel 22 of the front frame 2 and the side face of the backlight module 4 and is snap-fitted with the side bezel 22 of the front frame 2.

As shown in FIG. 1, based on the above embodiment, in a preferred embodiment, the stop portion 31, the connecting portion 32 and the mounting portion 33 of the elastic member 3 are connected in sequence in stepped shape. The stepped elastic member 3 can make good use of the space between the display panel 1 and the front frame 2 to realize its buffer effect. Optionally, the connecting position between the stop portion and the connecting portion and the connecting position between the connecting portion and the mounting portion are right-angled so that the elastic member can more snugly fit other components so as to realize better protection effect.

As shown in FIG. 1, based on the above embodiment, the connecting portion 32 of the elastic member 3 can contact the end face of the bent bezel 51 of the back plate 5. The connecting portion 32 of the elastic member 3 can be connected with the stop portion 31 and contact the end face of the bent bezel 51. Then, when the front bezel 21 tilts towards the display panel and presses the stop portion 31 downwards, the stop portion 31 can transfer the pressure applied on it to the back plate 5 through the connecting portion 32, that is, the back plate 5 can support the stop portion 31 through the connecting portion 32.

Of course, the elastic member 3 in the display device of the present disclosure is not limited to stepped shape, as shown in FIG. 2; the elastic member 3 can also be Z-shaped elastic member. The mounting portion 33 of the elastic member 3 can be connected with the bezel by bonding (for example, at the mounting portion 33), so as to facilitate further installation of the components of the display device. It should be noted that other shaped elastic member can be used to realize the above mentioned technical effect, for example W shape, I shape and the like.

Figure 3:
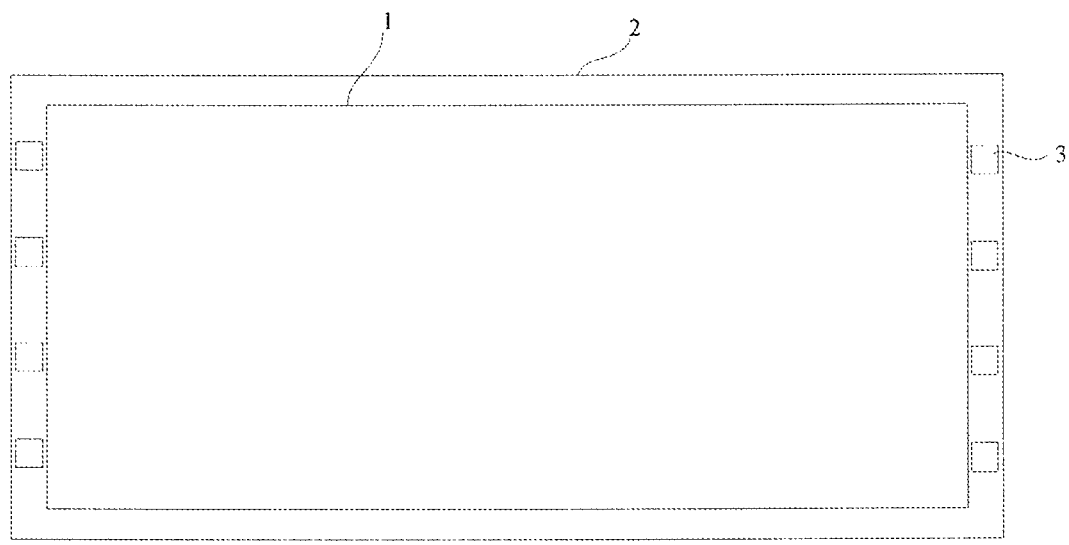
FIG. 3 is a structure schematic view of a display device housing provided by an embodiment of the present disclosure.

As shown in FIG. 3, based on the above various embodiments, in a specific embodiment, the front frame 2 is provided with a plurality of elastic members 3. Although eight elastic members 3 are shown in FIG. 3, it should be noted that more or less elastic members 3 can be provided in the front frame 2. According to an aspect of the present disclosure, a plurality of elastic members 3 are distributed at two side edges of the display device parallel to the extension direction of the data lines. At the two side positions of the display device, the gap between the front frame 2 and the display panel 1 is relatively larger; it is more convenient to dispose the elastic members 3. The elastic members 3 distributed at two opposite sides can effectively avoid the generation of bright spots in the display screen.

It will be apparent to those skilled in the art that various modifications and variations can be made to the present disclosure without departing from the spirit or scope of the application. If the modifications and variations are within the spirit and principle of the claims and their appropriate legal equivalents of the application, these modifications and variations are included within the scope of the present application. The term "comprising" does not exclude the presence of other elements or steps. Although steps of methods are described in certain sequence, it should be noted that the steps in the method claims can be executed in parallel or in a reverse order without departing from the spirit and principle of the present disclosure. The use of the words "a", "an" does not exclude the presence of a plurality of such elements. The mere fact that certain measures are recited in mutually different dependent claims does not indicate that a combination of these measures cannot be used to advantage. Any reference signs in the claims should not be construed as limiting the scope of the claims or the application.

The invention claimed is:

1. A display device housing comprising a front frame and a back plate which cooperate to form an accommodation portion for accommodating a display panel and a backlight module; and at least one elastic member mounted inside the front frame, wherein at least a portion of the at least one elastic member is disposed between the front frame and a side face of the display panel to be mounted, wherein the at least one elastic member is a disintegrated element that is disintegrated from the front frame and the back plate, and the minimum distance between the at least one elastic member in the display device housing and a front bezel of the front frame is less than the minimum distance between a light emitting surface of the display panel and the front bezel of the front frame, wherein the front frame comprises a side bezel which is used to surround the side face of the display panel, at least a part of the at least one elastic member abuts against the side bezel, and wherein the back plate is provided with a bent bezel for surrounding a side face of the backlight module, the bent bezel is snap-fitted with the side bezel of the front frame, each of the at least one elastic member is formed in a Z shape and comprises: a stop portion which is used to limit the side face of the display panel; a mounting portion which is fixedly connected to the back plate; and a connecting portion connecting the stop portion and the mounting portion, a first corner between the stop portion and the connecting portion is of an acute angle and abuts against the backlight module, and a second corner between the mounting portion and the connecting portion is of an acute angle and abuts against the front bezel, an extremity of the stop portion also abuts against the front bezel, and an extremity of the mounting portion abuts against the bent bezel of the back plate.

2. The display device housing according to claim 1, wherein the front bezel is used to limit an edge of a light emitting surface of the display panel; and the at least one elastic member inside the front frame extends from the side bezel towards the front bezel.

3. The display device housing according to claim 2, wherein the at least one elastic member extends to the vicinity of a location of the front frame which is directly opposite to the side face of the display panel to be mounted.

4. The display device housing according to claim 3, wherein the stop portion extends to the vicinity of the front bezel.

5. The display device housing according to claim 1, wherein the mounting portion and the back plate are fixedly connected by bonding or snap fitting.

6. The display device housing according to claim 1, wherein the at least one elastic member is an integral structure and is made of a soft material.

7. A display device, comprising the display device housing according to claim 1 wherein the display panel is located in the accommodation portion of the display device housing.

8. The display device according to claim 7, further comprising the backlight module located in the accommodation portion of the display device housing; wherein the back plate is provided with a bent bezel surrounding a side face of the backlight module, and the bent bezel is located between the side bezel of the front frame and the side face of the backlight module and is connected with the side bezel of the front frame.

9. The display device according to claim 8, wherein the mounting portion of the at least one elastic member is connected with the bent bezel of the back plate by snap fitting or bonding.

10. The display device according to claim 7, wherein the display device housing comprises a plurality of elastic members, the plurality of elastic members are distributed at two opposite sides of the display panel uniformly, and an extending direction of the two sides is parallel to an extending direction of data lines in the display panel.

* * * * *